(12) United States Patent
Tong et al.

(10) Patent No.: US 6,390,476 B1
(45) Date of Patent: May 21, 2002

(54) HEAT-RESISTANT MAGNETIC SILICONE RUBBER BRUSH SEALS IN TURBOMACHINERY AND METHODS OF APPLICATION

(75) Inventors: Wei Tong; ZhangQing Zhuo, both of Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 09/657,527

(22) Filed: Sep. 8, 2000

(51) Int. Cl.[7] ............................................. F16J 15/447
(52) U.S. Cl. ...................................................... 277/355
(58) Field of Search ........................................ 277/355

(56) References Cited

U.S. PATENT DOCUMENTS

| | | |
|---|---|---|
| 4,281,838 A | * 8/1981 | Persson ..................... 277/355 |
| 5,090,710 A | 2/1992 | Flower |
| 5,400,586 A | 3/1995 | Bagepalli et al. |
| 5,630,590 A | * 5/1997 | Bouchard et al. ........... 277/355 |
| 6,027,121 A | * 2/2000 | Cromer et al. .............. 277/355 |
| 6,257,588 B1 | * 7/2001 | Bagepalli et al. ........... 277/355 |

* cited by examiner

Primary Examiner—Anthony Knight
Assistant Examiner—John L. Beres
(74) Attorney, Agent, or Firm—Nixon & Vanderhye

(57) ABSTRACT

A brush seal includes a brush seal body formed of heat-resistant magnetic silicone rubber material in the form of a channel. Bristles are disposed in the channel of the brush seal body at a cant angle and project from the edges of the body terminating in bristle tips. The brush seal is formed linearly and, in use, flexed to form an annular seal between adjacent annular sealing components, with the seal carried by one component and the bristle tips engaging the opposite component. The magnetic material of the seal body enables temporary securement of the seal to one of the components, while the seal is adjusted and finally secured in place.

22 Claims, 3 Drawing Sheets

HEAT-RESISTANT MAGNETIC SILICONE RUBBER BRUSH SEALS IN TURBOMACHINERY AND METHODS OF APPLICATION

BACKGROUND OF THE INVENTION

The present invention relates to brush seals for use in turbomachinery such as gas and steam turbines to minimize leakage flows and particularly to a flexible heat-resistant magnetic silicone rubber brush seal useful over a wide range of sealing dimensions. The present invention further relates to a flexible brush seal formed of a magnetic material for at least temporarily adhering the brush seal to one of the sealing components to facilitate installation, either as original equipment or as a retrofit.

In turbomachinery such as gas and steam turbines, compressors and turbopumps, a number of seals are used at different locations for minimizing leakage flows. For example, seals may be provided between sealing surfaces which are both movable relative to one another or between components in which one component moves relative to another component, e.g., a stationary housing and a rotating shaft.

Brush seals, particularly in turbomachinery, typically comprise a plurality of elongated wire bristles in contact with a movable, e.g., rotating surface. The bristles provide a tight rub-tolerant seal which experiences only slight degradation over time. The bristles of the seal are compliant in use and this minimizes damage due to transient impact between the sealing components. A typical brush seal is formed by folding bristles over a rod with an outer clamp maintaining the folded bristles, squeezing the bristles between a folded metal plate forming a clamp or sandwiching the bristles between a pair of supporting metal plates and welding the plates and bristles at their proximal ends to one another. The distal ends of the bristles typically project a certain distance from the margins of the backing plates or clamps to engage the opposing sealing component. Common to these types of brush seals is that the bristle holder or carrier is formed of metal which is usually machined with a tight tolerance and thus the brush seal is applicable to only a specific sealing dimension. For other sealing dimensions, e.g., diameters, a separately manufactured and distinct brush seal must be used in order to dimensionally fit the seal with its carrier. Consequently, the brush seals are costly in terms of tooling, manufacturing and installation and long cycle times in brush seal manufacturing and retrofitting are required. Accordingly, there is a need for an improved brush seal where one size fits many different sizes of brush seals. Additionally, there is a need to facilitate installation of a brush seal without use of ancillary jigs or fixtures typically necessary to hold or temporarily secure the brush seal to its carrier.

BRIEF SUMMARY OF THE INVENTION

In accordance with a preferred embodiment of the present invention, there is provided a brush seal having a seal body formed of a flexible magnetic material such as a heat-resistant magnetic silicone rubber material. Preferably, the bristles are embedded, glued or otherwise secured to the brush seal body such that the bristles project from the body, terminating in tips for sealing engagement with the opposing sealing component. It will be appreciated that by bending the magnetic silicone rubber of the brush seal body, the brush seal can fit a wide range of sealing dimensions and complex sealing geometry. For example, where the brush seal is to be applied between a fixed annulus and a shaft rotating within the annulus, the brush seal body may be flexed to conform to the dimensions of the two components. Additionally, by changing the brush bending pattern, the brush body can be used for either outer sealing where the bristles point radially outward, inner sealing where the bristles point radially inward, or axial sealing where the bristles point parallel to the rotor axis. This type of brush seal is particularly suitable for large sealing dimensions, such as forty inches or more. It will also be appreciated that the brush seal body can be flexed or bent into virtually any irregular shape, for example, a non-linear shape other than circular, and thus may be used for sealing between irregularly-shaped components. An example of the latter is a brush seal interposed between a transition piece and a first-stage nozzle in a gas turbine.

Additionally, by forming the brush seal body from a magnetic silicone rubber, the seal may be readily adhered to one of the sealing components. Preferably, the adherence is temporary until the seal body can be finally adjusted and secured in its desired position. Ancillary jigs or fixtures useful to maintain the brush seal body in position while adjustments are being made prior to final securement are entirely eliminated. A magnetic silicone rubber is preferred and comprises a composite material of ferrite magnetic powder and a silicone polymer. With those characteristics, the brush seal body can be bent, twisted or coiled and thus easily configured for installation.

In a preferred embodiment according to the present invention, there is provided a brush seal for sealing between first and second components movable relative to one another and having non-linear opposed sealing surfaces, comprising a brush seal body carried by the first component and having a plurality of bristles secured to the body and projecting therefrom to terminate in bristle tips for engaging the second component, the brush seal body being formed of a flexible material for conformance to the non-linear opposed sealing surfaces.

In a further preferred embodiment according to the present invention, there is provided a brush seal for sealing between first and second components movable relative to one another and having non-linear opposed sealing surfaces, comprising a brush seal body carried by the first component and having a plurality of bristles secured to the body and projecting therefrom to terminate in bristle tips for engaging the second component, the brush seal body being formed of a magnetic material for magnetic attachment to the non-linear opposed sealing surface of one component.

In a still further preferred embodiment according to the present invention, there is provided a method of forming a brush seal between first and second components movable relative to one another, comprising the steps of providing a brush seal body formed of magnetic material and having a plurality of bristles projecting therefrom terminating in tips for engagement with the second component and magnetically adhering the brush seal body to the first component.

In a still further preferred embodiment according to the present invention, there is provided a method of forming a brush seal between first and second components movable relative to one another, comprising the steps of providing a brush seal body formed of a flexible material and having a plurality of bristles projecting therefrom terminating in tips for engagement with the second component and flexing the brush seal body for conformance to the first component.

DETAILED DESCRIPTION OF THE INVENTION

Figure 1:
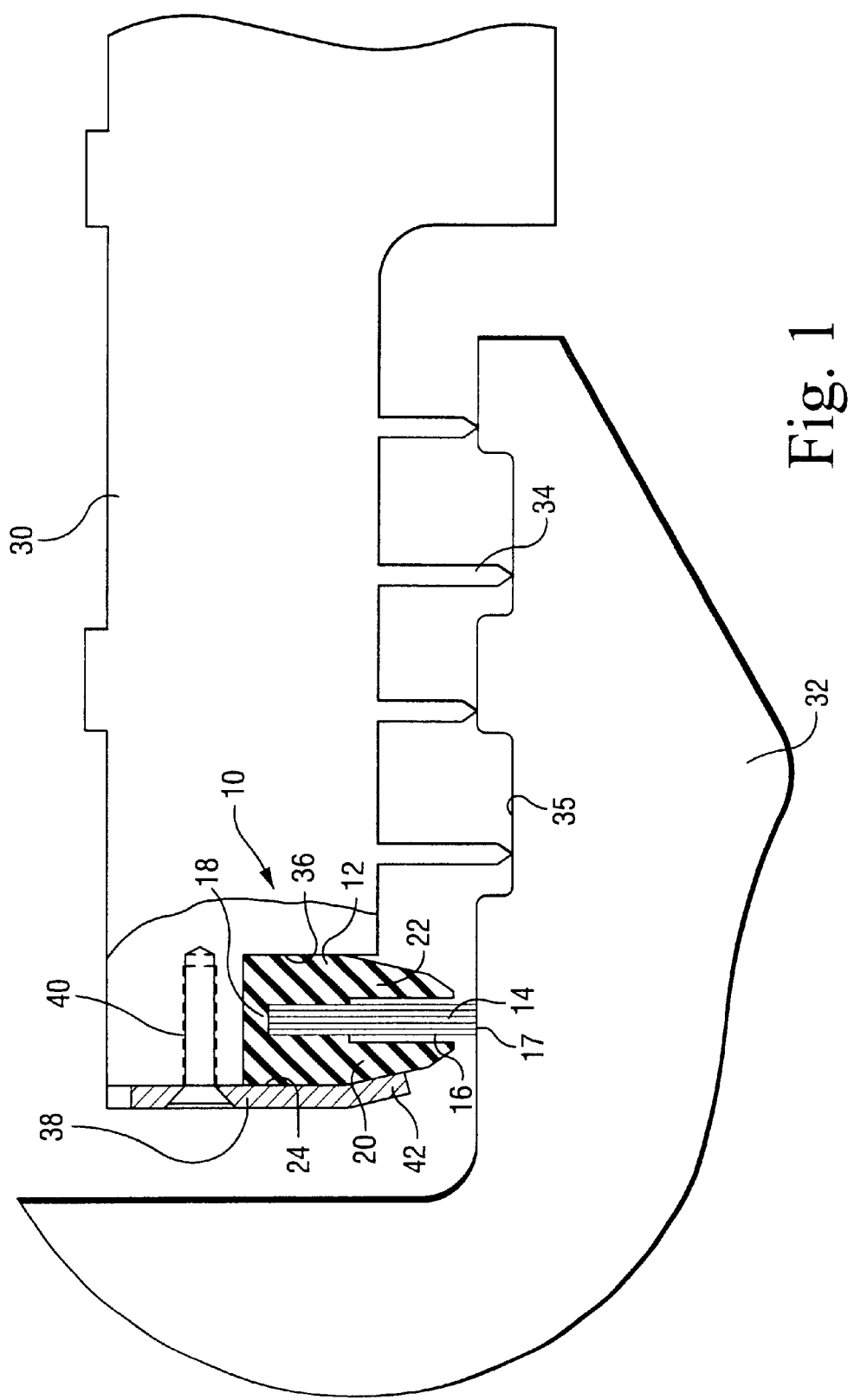
FIG. 1 is a fragmentary cross-sectional view illustrating a brush seal constructed in accordance with a preferred embodiment of the present invention installed in a high pressure packing.

Referring now to the drawings, there is illustrated a brush seal, generally designated 10, constructed in accordance with a preferred embodiment of the present invention. Brush seal 10 includes a brush seal body 12 and a plurality of bristles 14 forming a bristle pack 16 carried by the brush seal body 12. In a preferred embodiment, the brush seal body 12 is comprised of a heat-resistant magnetic flexible silicone rubber material in the general shape of an elongated channel having a base 18 and opposite sides 20 and 22. The bristle pack 16 comprises a plurality of bristles 14 disposed in the groove or channel 24 of the body 12 terminating in bristle tips 17. Typically, the bristles are elongated, formed of metal and have diameters ranging from 0.002 to 0.01 inch, depending upon the temperature, pressure and sealing pattern in which the bristles are to be used. It will be appreciated that non-metal materials such as aramid fibers, e.g., KEVLAR®, may be utilized, particularly in view of their capacity to operate at high temperature conditions, for example, up to 425° C.

Because turbomachinery typically operates at high temperature, the rubber material selected for the brush seal body 12 has substantial resistance to high temperatures. Silicone rubbers, for example, have high temperature resistance, up to 325° C., and also remain flexible at very low temperatures. Preferably, a magnetic silicone rubber comprised of a ferrite magnetic powder and silicone polymer is used. With those characteristics, the brush seal body 12 and bristles 14 can be bent, twisted, coiled and easily fabricated. It will also be appreciated that the body 12 need not be formed of one piece. For example, the flexible material may comprise a pair of backing pieces joined to one another at the base 18 and to the bristles. Alternatively, the proximal ends of the bristles may be secured in or to a base piece, in turn secured to a pair of side pieces.

The seal 10 has many applications. For example, in FIG. 1, the seal 10 is employed in a high pressure packing in a turbine. An inner barrel 30 comprising a first stationary component is generally concentrically arranged about an aft stub shaft 32 comprising a second rotating component. A brush seal 10 is mounted adjacent the end of the barrel in annular sealing relation about the stub shaft 32, the bristle tips 17 lying in engagement with the surface of the shaft 32. Note the labyrinth-type seals 34 disposed annularly about the grooves 35 of the stub shaft 32 for forming a labyrinth seal in combination with the brush seal 10. Preferably, the brush seal 10 is mounted in a groove 36 formed on the end of the barrel. The brush seal 10 is secured to the barrel 30 in the groove 36 by an overlying annular or arcuately segmented end plate 38 secured to the barrel 30, for example, by bolts 40. The end plate 38 has a lower tapered annular edge 42 for retaining the brush seal 10 in the groove 36.

It will be appreciated that the brush seal 10 is formed in a linear extending strip. For example, the silicone rubber material may be extruded in the form of a channel with the bristles planted in the base of the channel-shaped extrusion, the bristles extending at a cant angle relative to the longitudinal dimension of the linear brush seal strip. Where a pair of discrete sides are secured to one another to form the brush seal strip, the bristles may be glued between the two sides and to the base of the strip. The bristles are typically inclined relative to the longitudinal length of the strip at a cant angle of about 40 to 50° relative to a plane passing perpendicularly through the strip. Also, the strip may be installed in discrete arcuate segments or as a unitary strip extending completely between the two components being sealed.

To install the strip onto the inner barrel 30 of FIG. 1, the brush seal 10 can be flexed into an annular form or into arcuate segments to conform to the arcuate dimensions of the groove 36. Once the long dimension of the brush seal strip is determined, the strip can be cut to the appropriate length and flexed for reception in the groove 36. The magnetic material of the brush seal 10 provides a magnetic attraction with the metal of the barrel 30. Consequently, the brush seal can be disposed in the groove 36 and temporarily held in the groove by magnetic attraction while the end plate 38 is applied to finally secure the brush seal in the groove. It will be appreciated that the brush seal may be flexed to a wide range of different diameters or radii where arcuate segments are being used as well as into irregular shapes for other seal applications.

Figure 2:
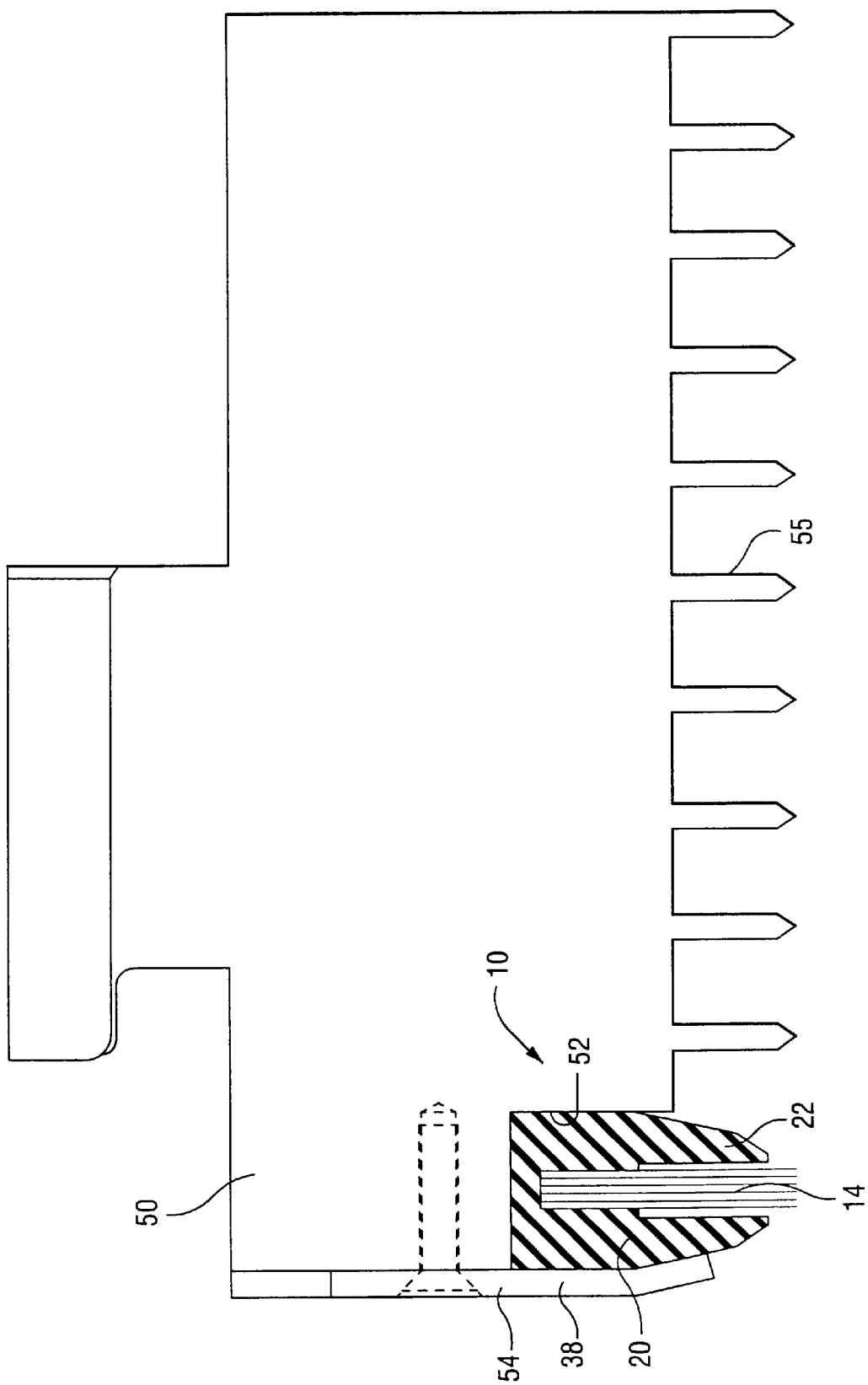
FIG. 2 is a view similar to FIG. 1 illustrating the brush seal hereof similarly as shown in FIG. 1 in a bearing.

Another application of the brush seal 10 hereof is illustrated in FIG. 2. In FIG. 2, a seal carrier 50 forming part of a bearing is illustrated with the brush seal 10 installed in a groove 52 of the carrier 50. As in the prior embodiment, the brush seal 10 is cut to length for conformance to the arcuate dimensions of the groove 52. The brush seal can then be flexed for location in the groove 52 with the magnetic material temporarily maintaining the brush seal in the groove. The annular or segmented end plate 54 is then secured to the seal carrier 50 to finally secure the brush seal in the groove. The brush seal, as illustrated, is used in conjunction with labyrinth teeth 55 formed on the seal carrier 50.

As noted previously, by changing the brush bending pattern, a rubber brush seal can be used for outer sealing where the bristles point radially outwardly, inner sealing where the bristles point radially inwardly as in the seals illustrated in FIGS. 1 and 2, or axial seals where the bristles point parallel to the rotor axis. Thus, it will be appreciated that the sealing strip can be flexed or bent both in the plane of the bristles to form an annular seal such as illustrated in FIGS. 1 and 2, or about an axis normal thereto to provide an axial projecting brush seal. In each of the illustrated embodiments of FIGS. 1 and 2, the leakage control is provided by both the brush seal and the labyrinth seal teeth.

Figure 3:
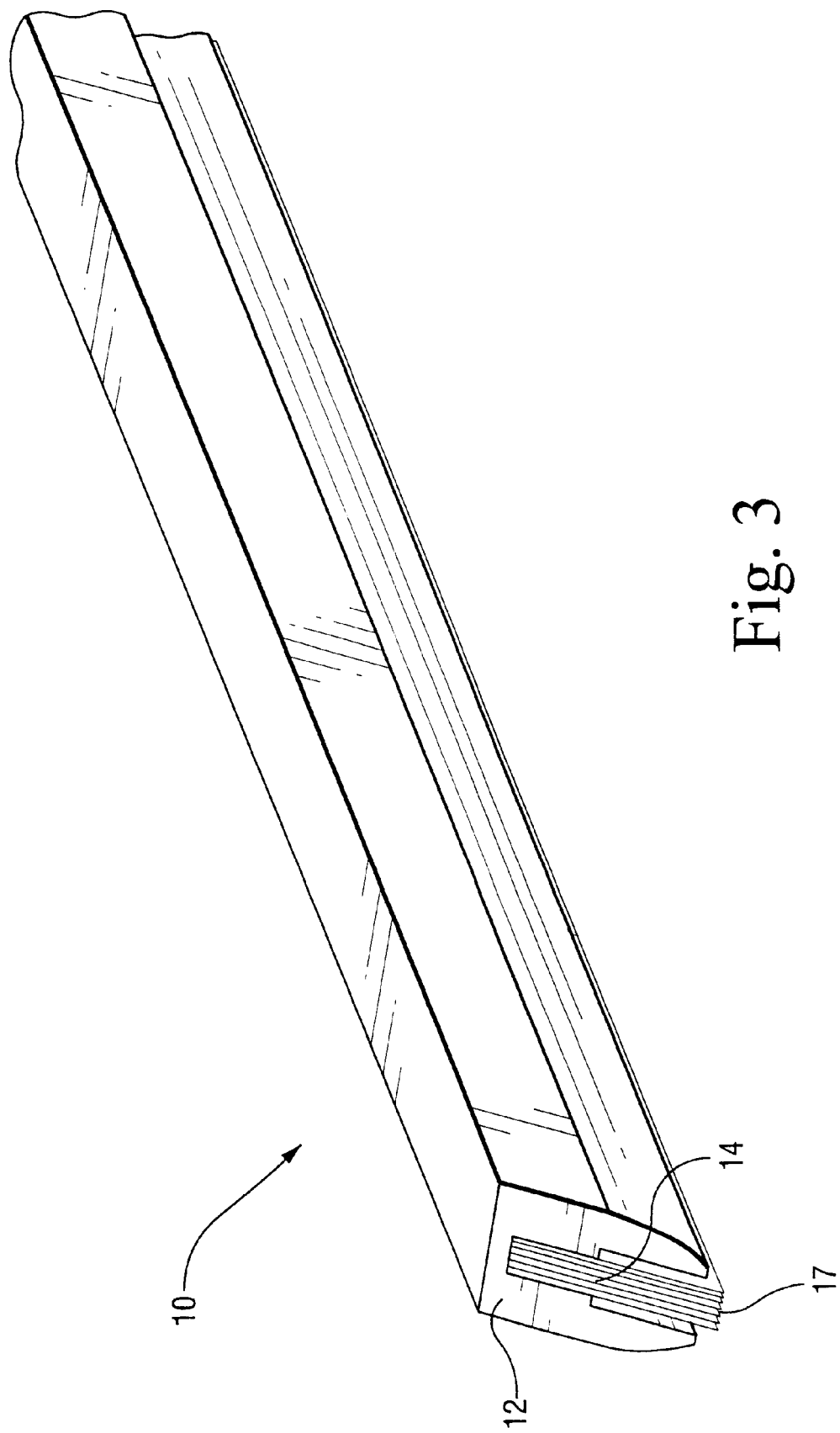
FIG. 3 is a perspective view of the brush seal in linear form prior to bending or flexing for use in a seal.

It will be appreciated from the foregoing description of the brush seal hereof that the flexible nature of the brush seal enables the brush seal to be used in most sealing applications in turbomachinery and particularly without regard to the dimensions of the sealing surfaces. That is, the brush seal can be flexed to accommodate various arcuate or irregular dimensions and cut to length, thereby providing a seal where one size, for example, as illustrated in FIG. 3, fits a substantial number of different seal applications and dimensions in the turbomachinery.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal for sealing between first and second components movable relative to one another and having non-linear opposed sealing surfaces, comprising:
   a brush seal body carried by said first component and having a plurality of bristles secured to said body and projecting therefrom to terminate in bristle tips for engaging said second component;
   said brush seal body being formed of a flexible magnetic material for conformance to the non-linear opposed sealing surfaces.

2. A brush seal according to claim 1 in combination with said first and second components, said first component including a groove for receiving said brush seal body.

3. A combination according to claim 2, wherein said groove opens through an end face of said first component, a brush seal holder overlying said end face and said brush seal body for retaining said brush seal body in said groove, and a fastener connecting said holder and said first component to one another.

4. A combination according to claim 3, wherein said first component includes a plurality of labyrinth seal teeth extending therefrom toward said second component.

5. A combination according to claim 4, wherein said first component comprises a stationary annular component and said second component comprises a rotatable shaft surrounded by said first component and engaged by said bristle tips.

6. A brush seal for sealing between first and second components movable relative to one another and having non-linear opposed sealing surfaces, comprising:
   a brush seal body carried by said first component and having a plurality of bristles secured to said body and projecting therefrom to terminate in bristle tips for engaging said second component;
   said brush seal body being formed of a flexible material for conformance to the non-linear opposed sealing surfaces;
   said material comprising a silicone rubber material.

7. A brush seal according to claim 6, wherein said body has a length and is generally channel-shaped in cross-section, said bristles at least partially disposed within the channel of said channel-shaped cross-section of said body.

8. A brush seal for sealing between first and second components movable relative to one another and having non-linear opposed sealing surfaces, comprising:
   a brush seal body carried by said first component and having a plurality of bristles secured to said body and projecting therefrom to terminate in bristle tips for engaging said second component;
   said brush seal body being formed of a magnetic material for magnetic attachment to the non-linear opposed sealing surface of said one component.

9. A brush seal according to claim 8, wherein said material comprises a flexible silicone rubber material enabling the body for conformance to the sealing surface of said one component.

10. A brush seal according to claim 9, wherein said body has a length and is generally channel-shaped in cross-section, said bristles at least partially disposed within the channel of said channel-shaped cross-section of said body.

11. A brush seal according to claim 8, in combination with said first and second components, said first component including a groove for receiving said brush seal body.

12. A brush seal according to claim 11, wherein said groove opens through an end face of said first component and a brush seal holder overlying said end face and said brush seal body for retaining said brush seal body in said groove, and a fastener connecting said holder and said first component to one another.

13. A brush seal according to claim 12 wherein said first component includes a plurality of labyrinth seal teeth extending therefrom toward said second component.

14. A brush seal according to claim 13 wherein said first component comprises a stationary annular component and said second component comprises a rotatable shaft surrounded by said first component and engaged by said bristle tips.

15. A method of forming a brush seal between first and second components movable relative to one another, comprising the steps of:
   providing a brush seal body formed of magnetic material and having a plurality of bristles projecting therefrom terminating in tips for engagement with the second component; and
   magnetically adhering the brush seal body to the first component.

16. A method according to claim 15 including temporarily magnetically adhering the brush seal body to the first component and thereafter finally securing the brush seal body to the first component to form a seal with the second component.

17. A method according to claim 15 including providing a brush seal body of flexible material and flexing the body to conform to a mounting surface on said first component for mounting the seal body on said first component.

18. A method according to claim 17, wherein said first component comprises a stationary annular component and said second component comprises a rotatable shaft surrounded by said first component, forming a groove in said stationary fixed component for receiving said body, temporarily magnetically adhering the brush seal body in said groove and thereafter finally securing the brush seal body to the first component to form a seal with the second component.

19. A method of forming a brush seal between first and second components movable relative to one another, comprising the steps of:
   providing a brush seal body formed of a flexible magnetic material and having a plurality of bristles projecting therefrom terminating in tips for engagement with the second component; and
   flexing the brush seal body for conformance to the first component.

20. A method according to claim 19 wherein said first component comprises a stationary annular component and said second component comprises a rotatable shaft surrounded by said first component, forming a groove in said stationary fixed component for receiving said body, flexing the brush seal body for disposition in said groove and thereafter finally securing the brush seal body to the first component to form a seal with the second component.

21. A method according to claim 19 including magnetically adhering the brush seal body to one of said components.

22. A method according to claim 19 wherein the first component comprises a stationary annular component and the second component comprises a rotatable shaft surrounding said first component and including forming a groove in said stationary component and magnetically adhering said body in said groove.

* * * * *

UNITED STATES PATENT AND TRADEMARK OFFICE
CERTIFICATE OF CORRECTION

PATENT NO. : 6,390,476 B1 Page 1 of 1
APPLICATION NO. : 09/657527
DATED : May 21, 2002
INVENTOR(S) : Tong et al.

It is certified that error appears in the above-identified patent and that said Letters Patent is hereby corrected as shown below:

In Column 1, Line 5 immediately below the title, insert:

--The Government of the United States of America has rights in this invention pursuant to Contract No. DE-FC21-95MC31176 awarded by the U.S. Department of Energy.--

Signed and Sealed this

Thirtieth Day of January, 2007

JON W. DUDAS
*Director of the United States Patent and Trademark Office*